(12) United States Patent
Hartmann et al.

(10) Patent No.: US 9,494,999 B2
(45) Date of Patent: Nov. 15, 2016

(54) METHOD FOR OPERATING A BUS CONTROL UNIT, AND BUS CONTROL UNIT

(75) Inventors: Juergen Hartmann, Gutenstetten (DE); Guenther Nagy, Ingolstadt (DE); Karl Spaeth, Koesching (DE)

(73) Assignee: AUDI AG, Ingolstadt (DE)

( * ) Notice: Subject to any disclaimer, the term of this patent is extended or adjusted under 35 U.S.C. 154(b) by 326 days.

(21) Appl. No.: 13/813,544

(22) PCT Filed: Jul. 1, 2011

(86) PCT No.: PCT/EP2011/003265
§ 371 (c)(1),
(2), (4) Date: Apr. 11, 2013

(87) PCT Pub. No.: WO2012/016613
PCT Pub. Date: Feb. 9, 2012

(65) Prior Publication Data
US 2013/0205145 A1   Aug. 8, 2013

(30) Foreign Application Priority Data
Jul. 31, 2010 (DE) .................. 10 2010 032 993

(51) Int. Cl.
*G06F 1/32* (2006.01)
*H04L 12/12* (2006.01)
*H04L 12/40* (2006.01)
*H04L 12/413* (2006.01)
*H04L 29/06* (2006.01)

(52) U.S. Cl.
CPC .............. *G06F 1/3253* (2013.01); *H04L 12/12* (2013.01); *H04L 12/40026* (2013.01); *H04L 12/40039* (2013.01); *H04L 12/413* (2013.01); *H04L 69/22* (2013.01); *H04L 2012/4026* (2013.01); *H04L 2012/40215* (2013.01); *H04L 2012/40273* (2013.01); *Y02B 60/34* (2013.01)

(58) Field of Classification Search
CPC ................. G06F 1/3253; H04L 69/22; H04L 12/40026; H04L 12/12; H04L 12/413; H04L 12/40039; H04L 2012/40273; H04L 2012/40215; H04L 2012/4026; Y02B 60/34
See application file for complete search history.

(56) References Cited

U.S. PATENT DOCUMENTS

| 5,757,773 | A |   | 5/1998  | Tsuji |
|-----------|---|---|---------|-------|
| 5,832,397 | A | * | 11/1998 | Yoshida ............. B60R 16/0315 340/459 |
| 6,484,082 | B1 |  | 11/2002 | Millsap et al. |

(Continued)

FOREIGN PATENT DOCUMENTS

| CN | 101456392 | 6/2009 |
|----|-----------|--------|
| CN | 101509791 | 8/2009 |

(Continued)

OTHER PUBLICATIONS

International Search Report for PCT/EP2011/003265, mailed on Aug. 31, 2011, 2 pages.

(Continued)

*Primary Examiner* — Jaweed A Abbaszadeh
*Assistant Examiner* — Brian J Corcoran
(74) *Attorney, Agent, or Firm* — Staas & Halsey LLP

(57) ABSTRACT

A watchdog function is performed for those messages which are used by a controller in a CAN bus to keep the other controllers active. All emitted keep-active messages are read again by the emitting controller itself and are checked for the presence of a reason. In the absence of such a reason, a restart is carried out.

12 Claims, 1 Drawing Sheet

(56) References Cited

U.S. PATENT DOCUMENTS

| | | | |
|---|---|---|---|
| 7,684,915 B1* | 3/2010 | Dailey et al. | 701/49 |
| 2003/0055942 A1 | 3/2003 | Senoo et al. | |
| 2003/0115543 A1* | 6/2003 | Emde et al. | 714/800 |
| 2004/0102216 A1* | 5/2004 | Rosebrock | 455/556.1 |
| 2004/0145500 A1* | 7/2004 | Huebl | 340/994 |
| 2004/0174909 A1* | 9/2004 | Marais et al. | 370/524 |
| 2007/0076593 A1* | 4/2007 | Sakurai | B60W 50/0205 370/219 |
| 2009/0198389 A1* | 8/2009 | Kirchhof-Falter et al. | 701/1 |
| 2009/0213915 A1* | 8/2009 | Wagner | 375/220 |

FOREIGN PATENT DOCUMENTS

| | | |
|---|---|---|
| DE | 44 46 314 | 6/1996 |
| DE | 102004026383 | 12/2005 |
| DE | 10 2010 032 993.2 | 7/2010 |
| EP | 0964556 | 12/1999 |
| JP | 2006-295487 | 10/2006 |
| WO | 2008/110957 | 9/2008 |
| WO | PCT/EP2011/003265 | 7/2011 |

OTHER PUBLICATIONS

German Office Action for Priority German Patent Application No. 10 2010 032 993.2, issued on Mar. 9, 2011.
Written Opinion on the International Searching Authority for PCT/EP2011/003265, 11 pages.
Written Opinion of the International Searching Authority for PCT/EP2011/003265, 15 pages.

* cited by examiner

METHOD FOR OPERATING A BUS CONTROL UNIT, AND BUS CONTROL UNIT

CROSS REFERENCE TO RELATED APPLICATIONS

This application is based on and hereby claims priority to International Application No. PCT/EP2011/003265 filed on Jul. 1, 2011 and German Application No. 10 2010 032 993.2 filed on Jul. 31, 2010, the contents of which are hereby incorporated by reference.

BACKGROUND

The invention relates to a method for operating a controller which is connected to a bus, in particular a CAN bus. It also relates to such a controller. CAN stands for "Controller Area Network". The CAN bus is an asynchronous serial bus system and belongs to the field buses (see the Wikipedia entry relating to this in the version of Jul. 15, 2010).

Controllers consume energy, with the result that their operation results in a battery being discharged. The CAN bus is used in a vehicle, in particular, and its battery can be discharged by the controllers.

For this reason, the controllers always deactivate themselves per se after a predetermined time. If the operation of a controller is now dependent on communication or cooperation of other controllers, it may prevent these other controllers from deactivating themselves by emitting a message for keeping these other controllers active (such a message can also be referred to as a network management message).

The message contains, in particular, at least one bit which is used to communicate a reason for keeping the controllers active.

It may now be the case that a controller operates incorrectly, for example by virtue of a corresponding software module for emitting the keep-active message not operating properly. In this case, a keep-active message may be emitted even though this is not required at all. The other controllers are then kept active and energy is permanently consumed, which eventually results in the complete emptying of the associated battery as the energy source.

A so-called "watchdog function" is known from DE 2004 026 383 B4 in connection with bus controllers.

SUMMARY

One potential object is to show a way of operating a bus controller in a functionally reliable manner.

The inventors propose a method for operating a first controller which is connected to a Controller Area Network (CAN) bus. The method involves emitting a keep-active message from the first controller to maintain communication with at least a second controller connected to the CAN bus, by using at least a first bit in the keep-active message to keep the second controller active and using at least a second bit in the keep-active message to communicate a reason for keeping the second controller active, the second bit being used during proper operation of the first controller. The method further involves reading at the first controller, all keep-active messages emitted by the first controller and checking at the first controller, whether a reason has been communicated. In the absence of the reason, resetting at least one of a software function and a component function.

The inventors also propose a first controller to connect to a Controller Area Network (CAN) bus. The first controller has a keep-active device to emit a keep-active message to keep a second controller on the CAN bus active, the keep-active message being emitted to the second controller. The first controller also has a check device to read all keep-active messages emitted by the first controller, to check whether a reason for keeping the second controller active has been communicated in the keep-active message and, in the absence of the reason, to reset at least some functions of the first controller.

According to the proposals, the controller thus reads all of the keep-active messages which are emitted by it and checks whether a reason has been communicated. In the absence of a reason, at least some of its functions are reset.

The proposals are based on the knowledge that incorrect emission of keep-active messages, that is to say emission if no reason is given, generally also results in such a reason not being communicated. The defectiveness in the method of operation of the controller can thus be discerned from the absence of a reason.

The defect can be rectified by resetting functions.

If functions of a data processing apparatus, such as a controller, are reset, software can either be reset, that is to say, in the absence of a reason, a program currently being executed is then restarted. A particular component can likewise be reset to a predetermined operating state. In this case, it is appropriate to completely reset a processor.

The proposed first controller is designed to carry out the method, with the result that the advantages of the method accordingly also apply to the controller.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
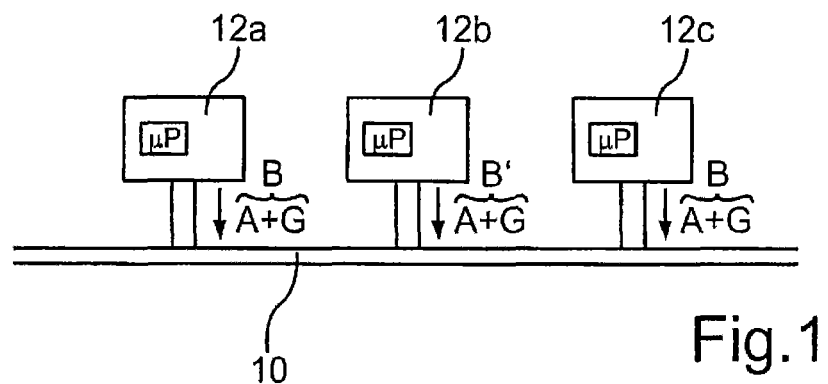
FIG. 1 shows an arrangement in which the proposed method can be used.

Reference will now be made in detail to the preferred embodiments of the present invention, examples of which are illustrated in the accompanying drawings, wherein like reference numerals refer to like elements throughout.

Controllers 12a, 12b, 12c are coupled to a controller area network bus (CAN bus) designated 10 as a whole. Each controller 12a to 12c has a microprocessor μP.

The controller 12a to 12c switches itself off after a predetermined time if it does not have to perform a task itself. It may be the case that one of the controllers 12a has to perform a task in which the other controllers 12b and 12c are intended to participate. It then emits a message B which communicates A that the other controllers 12b and 12c are intended to remain active, with a reason G for this being included in the message B (the message is transmitted by suitably set bits).

It may now be the case, as shown for the controller 12b, that a controller informs A the other controllers 12a and 12c, on account of a malfunction, for example software which is not running properly, that the controllers must remain active even if the controller 12b need not execute a task at all in which it requires the cooperation of these other controllers. However, the message B' emitted by the controller 12b in this case generally does not contain a reason G.

This is used in the present case as follows:

The method begins with a proper state of a controller, according to which a message B is emitted in step S10. Each controller is now supposed to once again itself read the messages for keeping the other bus subscribers (controllers) active which are emitted by it, that is the say to check the messages by a software unit independent of the emitting unit or by an independent component. The message emitted by the controller is therefore read in step S12. A check is then carried out in order to determine whether the reason G is included. As long as the reason G is included in the message, the controller is operating properly and there is no need for a measure other than that ensuring that step S12 is carried out again and again. In contrast, if the reason G is not included in a message, the controller is not operating properly and a restart is carried out in step S14, the respective microprocessor µP being completely reset in the present case. It is thus changed, for example, to a state which otherwise prevails when the controller is switched on. After the restart, the proper method of operation of the controller begins again, that is to say a message B is emitted sometime in step S10.

Figure 2:
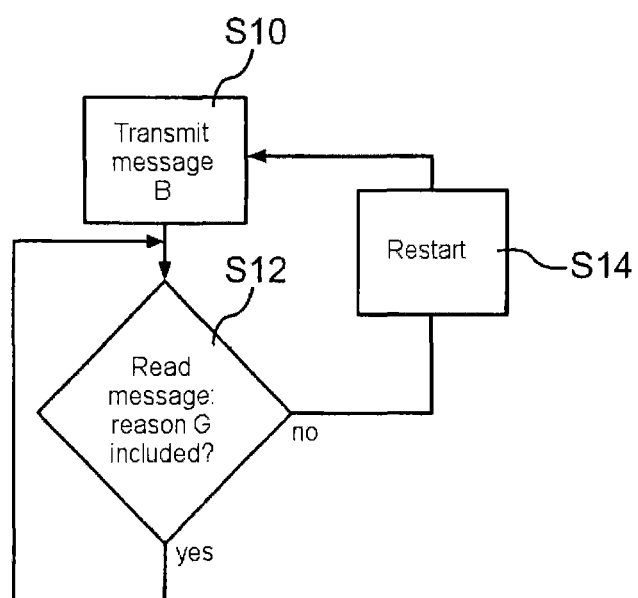
FIG. 2 shows a flowchart for explaining a preferred embodiment of the proposed method.

In the method, a start after step S10 is assumed, but, in principle, step S12 can be carried out directly with the switching-on of the controller. Previous transmission of a proper message B is not required, but the case shown in FIG. 2 is only a preferred embodiment.

A watchdog function with respect to the emission of keep-active messages (network management messages) is implemented by the proposals.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a first controller which is connected to a vehicle bus, comprising:
    emitting, by a keep-active device, a keep-active message from the first controller to maintain communication with at least a second controller connected to the vehicle bus, by a method comprising:
    using at least a first bit in the keep-active message to keep the second controller active; and
    using at least a second bit in the keep-active message to communicate a reason for keeping the second controller active, the second bit being included in the keep-active message during proper operation of the first controller;
    reading at the first controller, all keep-active messages emitted on the vehicle bus by the keep-active device and checking at the first controller, by a check device, whether the second bit is included in the keep-active message to determine whether the reason for keeping the second controller active has been communicated; and
    if the second bit is not included in the keep-active message, resetting, by the check device, at least one of a software function and a component function of the first controller,
    wherein
    the keep-active device includes a processor and an emitting unit that is operated by the processor to emit the keep-active messages to the second controller,
    the check device includes a software unit which is independent from the emitting unit which checks whether the second bit is included in the keep-active message to determine whether the reason for keeping the second controller active has been communicated in the keep-active messages emitted by the emitting unit, and
    the check device is inactive when no keep-active message has been emitted.

2. The method according to claim 1, wherein, if the second bit is not included in the keep-active message, a program currently being executed by the first controller is restarted.

3. The method according to claim 1, wherein
    the first controller has a processor, and
    if the second bit is not included in the keep-active message, the processor of the first controller is completely reset.

4. The method according to claim 1, further comprising using at least the first bit in the keep active message to keep a third controller active.

5. The method according to claim 1, wherein
    the resetting comprises restarting a program currently being executed by the first controller.

6. The method according to claim 1, wherein
    the reason for keeping the second controller active corresponds to a bit value of the second bit in the keep-active message and the bit value of the second bit indicates the reason for keeping the second controller active.

7. The method according to claim 6, wherein
    the bit value of the second bit indicates the reason for keeping the second controller active is to inform the second controller that cooperation of the second controller with the first controller is required for execution of a task by the first controller.

8. The method according to claim 1, wherein if the check device resets the at least one of the software function and the component function of the first controller as a result of determining the second bit is not included in the keep-active message when the emitting unit emits the keep-active message a first time, the method further comprises emitting the keep-active message a second time after the check device resets the at least one of the software function and the component function of the first controller.

9. A first controller to connect to a vehicle bus, comprising:
    a keep-active device to emit keep-active messages to keep second controllers on the vehicle bus active, the keep-active messages being emitted to the second controllers and including at least a first bit to keep the second controllers active and at least a second bit to communicate a reason for keeping the second controllers active; and
    a check device to read all keep-active messages emitted on the vehicle bus by the keep-active device, to check whether the second bit is included in each keep-active message to determine whether the reason for keeping the second controllers active has been communicated in the keep-active messages and, if the second bit is not included in the keep-active message, to reset at least some functions of the first controller,
    wherein
    the keep-active device includes a processor and an emitting unit that is operated by the processor to emit the keep-active messages to the second controllers, the check device includes a software unit which is independent from the emitting unit which checks whether the second bit is included in the keep-active message to determine whether the reason for keeping the second controllers active has been communicated in the keep-active messages emitted by the emitting unit, and the check device is inactive when no keep-active message has been emitted.

10. The first controller according to claim 9, wherein if the second bit is not included in the keep-active message, the check device restarts a program currently being executed by the first controller.

11. The first controller according to claim 9, wherein the reason for keeping the second controllers active corresponds to a bit value of the second bit in the keep-active messages and the bit value indicates the reason for keeping the second controllers active.

12. The first controller according to claim 11, wherein the bit value indicates the reason for keeping the second controllers active is to inform the second controllers that cooperation of the second controllers with the first controller is required for execution of a task by the first controller.

* * * * *